(12) United States Patent
Murai et al.

(10) Patent No.: US 12,018,763 B2
(45) Date of Patent: Jun. 25, 2024

(54) FLOW CONTROL VALVE

(71) Applicant: AISAN KOGYO KABUSHIKI KAISHA, Obu (JP)

(72) Inventors: Shinji Murai, Obu (JP); Yasuhiro Tsuzuki, Aichi-ken (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 39 days.

(21) Appl. No.: 17/911,389

(22) PCT Filed: Mar. 31, 2021

(86) PCT No.: PCT/JP2021/013859
§ 371 (c)(1),
(2) Date: Sep. 13, 2022

(87) PCT Pub. No.: WO2021/201110
PCT Pub. Date: Oct. 7, 2021

(65) Prior Publication Data
US 2023/0096186 A1    Mar. 30, 2023

(30) Foreign Application Priority Data

Apr. 2, 2020 (JP) ................................ 2020-066338
Jun. 18, 2020 (JP) ................................ 2020-105128

(51) Int. Cl.
*F16K 17/06* (2006.01)
*F16K 27/02* (2006.01)
*F16K 17/04* (2006.01)

(52) U.S. Cl.
CPC .......... *F16K 17/06* (2013.01); *F16K 27/0209* (2013.01); *F16K 17/044* (2013.01)

(58) Field of Classification Search
CPC ..... F16K 17/06; F16K 27/0209; F16K 17/044
See application file for complete search history.

(56) References Cited

U.S. PATENT DOCUMENTS 6,378,500 B1    4/2002  Schreckenberger
9,150,099 B2   10/2015  Kishi et al.
(Continued)

FOREIGN PATENT DOCUMENTS

JP    S6026341 U    2/1985
JP    H0640537 U    5/1994
(Continued)

OTHER PUBLICATIONS

PCT/JP2021/013859 International Search Report and Written Opinion dated May 25, 2021 (9 p.).
(Continued)

*Primary Examiner* — P. Macade Nichols
(74) *Attorney, Agent, or Firm* — CONLEY ROSE, P.C.

(57) ABSTRACT

A relief valve includes: a housing having a hollow cylindrical valve chamber and having a first communication port opening on one end side of the valve chamber; a first valve element for opening and closing the first communication port; a first spring for biasing the first valve element in the closing direction; and a retainer having a spring seat for supporting the first spring. A set load of the first spring is adjusted based on the press-fit amount of the retainer with respect to the housing. A press-fit piece member including a plurality of press-fit pieces is formed in the retainer, such that the press-fit pieces of the press-fit member are arranged to be spaced away from each other in the circumferential direction of the retainer and elastically abut the housing.

7 Claims, 10 Drawing Sheets

(56) References Cited

U.S. PATENT DOCUMENTS

| | | | |
|---|---|---|---|
| 9,863,541 B2 | 1/2018 | Hirano | |
| 2009/0283157 A1* | 11/2009 | Hogan | F16K 15/063 137/542 |
| 2017/0227135 A1* | 8/2017 | Crump | F16K 37/005 |
| 2021/0206257 A1 | 7/2021 | Makino et al. | |

FOREIGN PATENT DOCUMENTS

| JP | 2001082271 A | 3/2001 |
|---|---|---|
| JP | 2001124231 A | 5/2001 |
| JP | 2013152015 A | 8/2013 |
| JP | 5573891 B2 | 12/2013 |
| JP | 2019027286 A | 2/2019 |
| JP | 2019211017 A | 12/2019 |

OTHER PUBLICATIONS

PCT/JP2021/013859 International Preliminary Report on Patentability dated Oct. 13, 2022 (5 p.).

* cited by examiner

FLOW CONTROL VALVE

CROSS-REFERENCE TO RELATED APPLICATIONS

The present application is a 35 U.S.C. § 371 U.S. National Phase entry of, and claims priority to, PCT Application PCT/JP2021/013859 filed Mar. 31, 2021, which claims priority to Japanese Patent Application No. 2020-066338 filed Apr. 2, 2020, and Japanese Patent Application No. 2020-105128 filed Jun. 18, 2020, each of which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to flow control valves.

There is a conventional control device for a relief valve mechanism. The control device includes a relief valve seat (corresponding to a "housing body" as used herein), a relief valve (corresponding to a "valve element" as used herein), a relief spring (corresponding to a "spring" as used herein), and a relief spring stopper (corresponding to a "valve opening pressure adjustment member" as used herein). The relief valve seat has a bottomed cylindrical shape and a valve port at its bottom. The relief valve is configured to open and close the valve port of the relief valve seat. The relief spring biases the relief valve in the closing direction. The relief spring stopper has a spring seat portion that supports an end portion of the relief spring on a side of the relief spring opposite to the relief valve. The set load of the relief spring is adjusted based on the amount by which the relief spring stopper is press-fitted to the relief valve seat.

SUMMARY

In a case of the above conventional example of a control device for a relief valve mechanism, there is a problem that the press-fit load of the relief spring stopper is large, which was discovered to be in part due to the relief spring stopper abutting the relief valve seat over the entire circumference thereof.

Accordingly, embodiments described herein are directed to reducing the press-fit load of the valve opening pressure adjustment member with respect to the housing.

One aspect of this disclosure is a flow control valve including: a housing having a hollow cylindrical valve chamber and a valve port that opens at one end of the valve chamber; a valve element configured to open and close the valve port; a spring biasing the valve element in a closing direction; and a valve opening pressure adjustment member including a spring seat that supports an end of the spring on a side opposite to the valve element side of the spring. A set load of the spring is adjusted based on an amount by which the valve opening pressure adjustment member is press-fitted into the housing. A press-fit piece group or member, which includes a plurality of press-fit pieces, is formed in the valve opening pressure adjustment member such that the press-fit pieces are arranged to be spaced away from each other in a circumferential direction of the valve opening pressure adjustment member. The press-fit pieces elastically abut the housing.

In accordance with the above described aspect, the valve opening pressure adjustment member is formed with the press-fit piece member comprising of a plurality of press-fit pieces arranged to be spaced away from each other in the circumferential direction of the valve opening pressure adjustment member, the press-fit pieces elastically contacting the housing. Therefore, the press-fit load of the valve opening pressure adjustment member to the housing can be reduced in comparison to a case where the valve opening pressure adjustment member abuts the housing over the entire circumference (e.g. see, Japanese Laid-Open Patent Publication No. 2019-27286). As a result, the workability of press-fitting of the valve opening pressure adjustment member can be improved.

DETAILED DESCRIPTION

Hereinafter, embodiments of the present disclosure will be described with reference to the drawings.

A flow control valve according to a first embodiment is a relief valve 30 of a fuel vapor processing apparatus 10 mounted on a vehicle, such as an automobile, in which an internal combustion engine (engine) 24 is mounted. The fuel vapor processing apparatus 10 will first be described, and then the relief valve 30 will be described.

Figure 1:
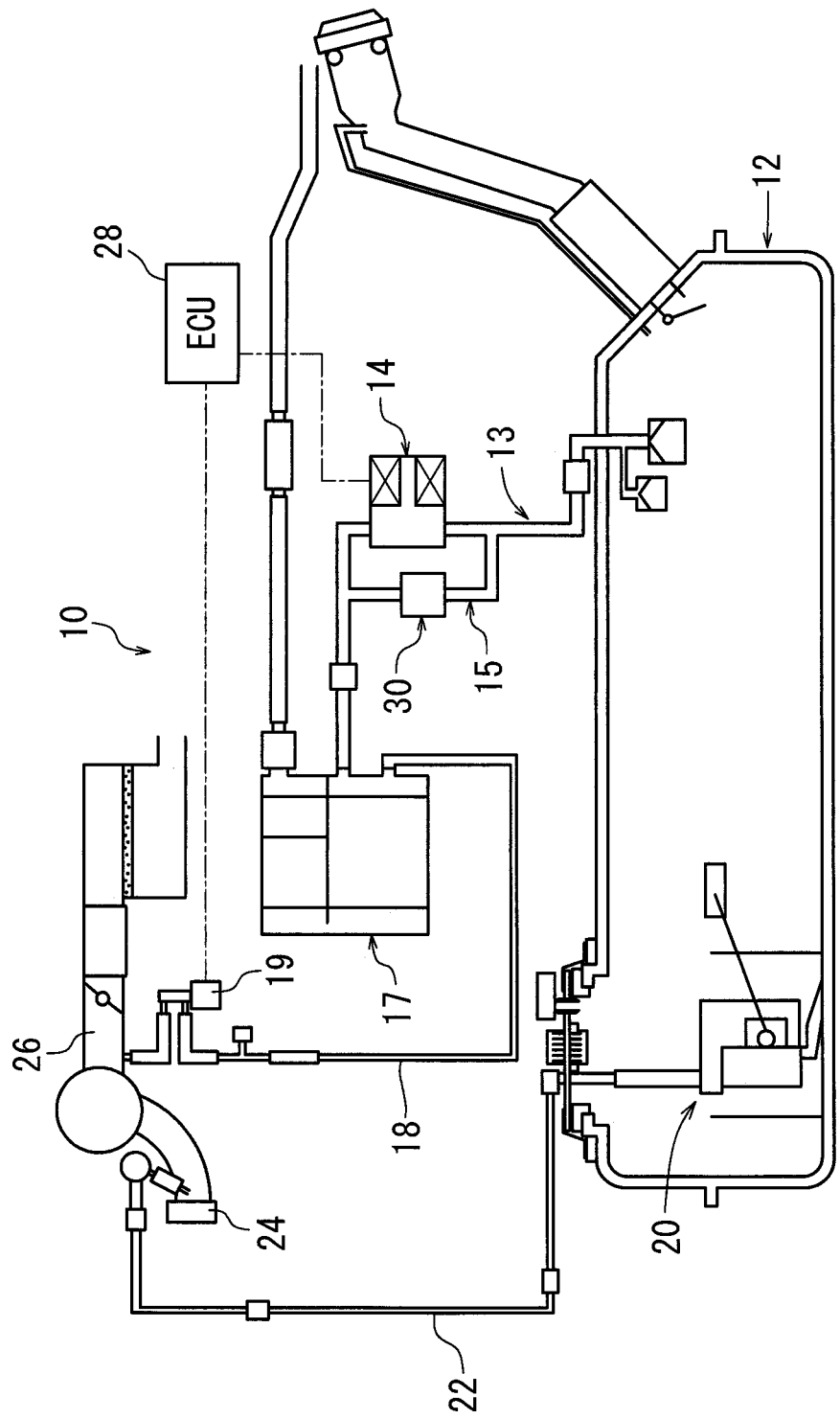
FIG. 1 is a schematic view of a fuel vapor processing apparatus according to a first embodiment.

FIG. 1 is the schematic view of a fuel vapor processing apparatus 10. As shown in FIG. 1, in the fuel vapor processing apparatus 10, fuel vapor evaporated in a fuel tank 12 flows through a vapor passage 13. The fuel vapor is adsorbed on an adsorbent, such as activated carbon, in a canister 17.

A closing valve 14 comprising an electric opening/closing valve is provided along the middle of the vapor passage 13. The vapor passage 13 includes a bypass passage 15 that bypasses the closing valve 14. The relief valve 30 is provided along the middle of the bypass passage 15. The fuel in the fuel tank 12 is supplied by a fuel supply device 20 from the fuel tank 12 to the internal combustion engine 24 via a fuel supply path 22.

The canister 17 is connected to an intake passage 26 of the internal combustion engine 24 via a purge passage 18. A purge valve 19 is provided along the middle of the purge passage 18. When the purge valve 19 is opened at a predetermined timing during the operation of the internal combustion engine 24, the fuel vapor in the canister 17 is supplied to the intake passage 26 through the purge passage 18. This may be done using the intake negative pressure of the internal combustion engine 24. The closing valve 14 and the purge valve 19 are controlled to be opened and closed by an electronic control unit (hereinafter also referred to as "ECU") 28.

While the vehicle is parked, the closing valve 14 is maintained in the closed state, so as to block the vapor passage 13. Accordingly, the fuel vapor in the fuel tank 12 does not flow into the canister 17. During refueling, the closing valve 14 is opened so as to allow fluid communication through the vapor passage 13. Thus, the fuel vapor in the fuel tank 12 flows through the vapor passage 13 and is adsorbed by the adsorbent in the canister 17. While the closing valve 14 is closed, e.g., during parking of the vehicle, the pressure in the fuel tank 12 is maintained at a proper pressure by the relief valve 30.

Figure 2:
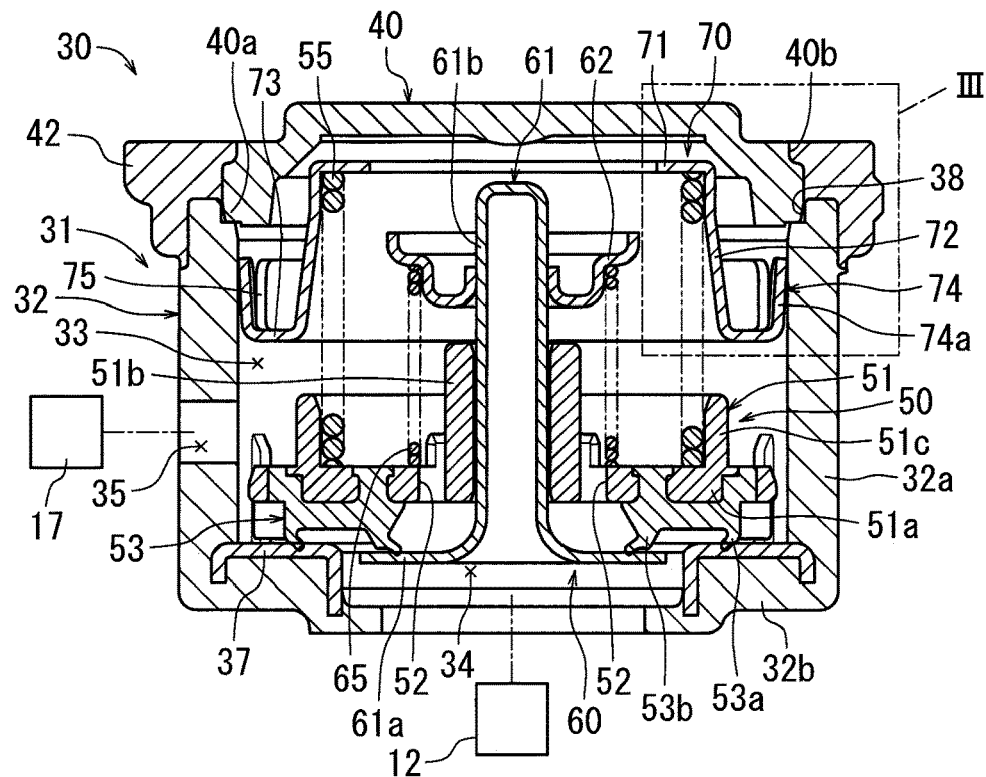
FIG. 2 is a cross-sectional view of the relief valve of FIG. 1.

FIG. 2 is a cross-sectional view of the relief valve 30. The up-down direction and the right-left direction with respect to the relief valve 30 are defined as shown in FIG. 2. For example, the relief valve 30 may be disposed in the vehicle such that the axial direction of the relief valve 30 is oriented in the vertical direction as shown in FIG. 2. The relief valve 30 may also be referred to herein as a "flow control valve."

As shown in FIG. 2, the relief valve 30 includes a housing 31, a positive pressure side relief valve mechanism 50, and a negative pressure side relief valve mechanism 60. The housing 31 includes a housing body 32, a cover 40, and a retaining member 42. The housing body 32 has a bottomed cylindrical shape. The cover 40 extends across and closes an opening at upper end of the housing body 32. The housing body 32 and the cover 40 define a valve chamber 33 within the relief valve 30. The valve chamber 33 has a hollow cylindrical shape with an axis extending in the vertical direction. The housing body 32 and the cover 40 may each be made of a resin material.

The housing body 32 includes a cylindrical wall portion 32a having a hollow cylindrical shape and an annular bottom wall portion 32b extending radially inward from a lower end of the cylindrical wall portion 32a. An inner periphery of the bottom wall portion 32b concentrically forms a first communication port 34 at the center of the bottom wall portion 32b. The first communication port 34 opens on one end side (lower end side) of the valve chamber 33. The first communication port 34 may also be referred to herein as a "valve port." A second communication port 35 is formed at a side portion of the cylindrical wall portion 32a.

The first communication port 34 is connected to the fuel tank 12 via the vapor passage 13 and the bypass passage 15 on the fuel tank 12 side (see FIG. 1). The second communication port 35 is connected to the canister 17 via the vapor passage 13 and the bypass passage 15 on the canister 17 side (see FIG. 1).

An annular valve seat 37 is concentrically disposed on an upper surface of the bottom wall portion 32b. The valve seat 37 is made of a metal material and is integrated with the bottom wall portion 32b by insert molding. An inner periphery of the valve seat 37 defines an upper opening edge portion of the first communication port 34. A stepped fitting recess 38 is formed in an inner periphery of an upper end of the cylindrical wall portion 32a (see FIG. 3).

The cover 40 has a cap shape that closes the upper end opening of the cylindrical wall portion 32a of the housing body 32. A lower end outer peripheral corner portion 40a of the cover 40 is fitted into the fitting recess 38 of the cylindrical wall portion 32a (see FIG. 3). A stepped engagement recess 40b is formed at an outer periphery of an upper end of the cover 40.

The retaining member 42 is formed in an annular shape covering both the outer periphery of the upper end of the cylindrical wall portion 32a and the outer periphery of the cover 40, which includes the engagement recess 40b. The retaining member 42 is formed by a secondary molding of a resin. The retaining member 42 connects the cover 40 to the housing body 32 in a locked state. The housing body 32 and the cover 40 are formed by a primary molding of a resin.

The positive pressure side relief valve mechanism 50 and the negative pressure side relief valve mechanism 60 are disposed within the valve chamber 33 of the housing 31. The positive pressure side relief valve mechanism 50 is configured to open when the pressure on the first communication port 34 side, that is the fuel tank 12 side, is equal to or greater than a first valve opening pressure, which is a predetermined positive pressure. The negative pressure side relief valve mechanism 60 is configured to open when the pressure on the fuel tank 12 side is equal to or less than a second valve opening pressure, which is a predetermined negative pressure. In FIG. 2, each of the relief valve mechanisms 50, 60 is shown in a closed state.

A first valve element 51 of the positive pressure side relief valve mechanism 50 and a second valve element 61 of the negative pressure side relief valve mechanism 60 are concentrically arranged and vertically movable within the valve chamber 33. The first valve element 51 has a first valve plate portion 51a with an annular plate shape for opening and closing the first communication port 34. An inner cylindrical portion 51b and an outer cylindrical portion 51c are concentrically formed on the first valve plate portion 51a, thereby defining an inner and outer double cylindrical shape. The first valve element 51 may be also referred to herein as the "valve element."

An annular seal member 53 made of a rubber-like elastic material is attached to an outer peripheral portion of a lower surface of the first valve plate portion 51a. An outer peripheral side seal lip 53a and an inner peripheral side seal lip 53b extend from a lower surface of the seal member 53 in a double annular shape. The outer peripheral side seal lip 53a faces the valve seat 37. The inner peripheral side seal lip 53b faces a second valve plate portion 61a of the second valve element 61.

The first valve plate portion 51a has a plurality of (two shown in FIG. 2) communication holes 52 on the radially inward side of the seal member 53. The communication holes 52 extend through the first valve plate portion 51a in the plate thickness direction (the up-down direction).

A retainer 70 is disposed at an upper portion of the valve chamber 33. The retainer 70 is disposed within the valve chamber 33 of the housing body 32 before attachment of the cover 40. The retainer 70 is configured to support a first spring 55 and to adjust the set load of the first spring 55. The retainer 70 will be described in more detail herein below.

The first spring 55, which comprises a coil spring, is concentrically disposed between opposite surfaces of the first valve plate portion 51a of the first valve element 51 and the retainer 70. The first spring 55 biases the first valve element 51 downward, that is, in the closing direction. The first valve plate portion 51a supports a lower end portion of the first spring 55 within the outer cylindrical portion 51c of the first valve element 51. The first spring 55 may be also referred to herein as a "spring."

The second valve element 61 includes the second valve plate portion 61a having a disc shape and a valve shaft portion 61b protruding upward from the second valve plate portion 61a. The valve shaft portion 61b is inserted into the inner cylindrical portion 51b of the first valve element 51 from below so as to be vertically movable. A spring receiving member 62 having an annular plate shape is attached to a tip portion (upper end portion) of the valve shaft portion 61b. The second valve plate portion 61a faces the inner peripheral side seal lip 53b of the seal member 53, and is configured to open and close the communication holes 52 of the first valve element 51. More specifically, the first valve element 51 abuts the inner peripheral side seal lip 53b so as to block fluid communication between the valve chamber 33 and the fuel tank 12 via the communication holes 52.

A second spring 65, which comprises a coil spring, is concentrically disposed between opposite surfaces of the first valve plate portion 51a of the first valve element 51 and the spring receiving member 62. A lower end portion of the second spring 65 is positioned on the outer peripheral side of the inner cylindrical portion 51b of the first valve element 51. The second spring 65 biases the second valve element 61 upward, that is in the closing direction. The second spring 65 has a biasing force that is less than the biasing force of the first spring 55.

As shown in FIG. 2, the first valve plate portion 51a of the first valve element 51 is normally in a closed state with the first valve plate portion 51a seated on the valve seat 37 due to the biasing force of the first spring 55. In this state, the outer peripheral side seal lip 53a of the seal member 53 is sealed to the valve seat 37. The second valve plate portion 61a of the second valve element 61 is also in a closed state with the second valve plate portion 61a is seated on the first valve plate portion 51a of the first valve element 51 due to the biasing force of the second spring 65. In this state, the inner peripheral side seal lip 53b of the seal member 53 is sealed to the second valve plate portion 61a.

When the pressure on the fuel tank 12 side becomes equal to or greater than the first valve opening pressure, which is the predetermined positive pressure, the first valve element 51 moves upward against the biasing force of the first spring 55. As such, the outer peripheral side seal lip 53a of the seal member 53 separates from the valve seat 37, thereby opening the positive pressure side relief valve mechanism 50 so that the fuel tank 12 is in a fluid communication with the canister 17 via the relief valve 30. As a result, the pressure in the fuel tank 12 decreases.

When the pressure on the fuel tank 12 side becomes equal to or less than the second valve opening pressure, which is the predetermined negative pressure, the second valve element 61 moves downward against the biasing force of the second spring 65. As such, the second valve plate portion 61a of the second valve element 61 separates from the inner peripheral side seal lip 53b of the seal member 53, thereby opening the negative pressure side relief valve mechanism 60 so that the fuel tank 12 is in a fluid communication with the canister 17 via the relief valve 30. As a result, the pressure in the fuel tank 12 increases.

Figure 5:
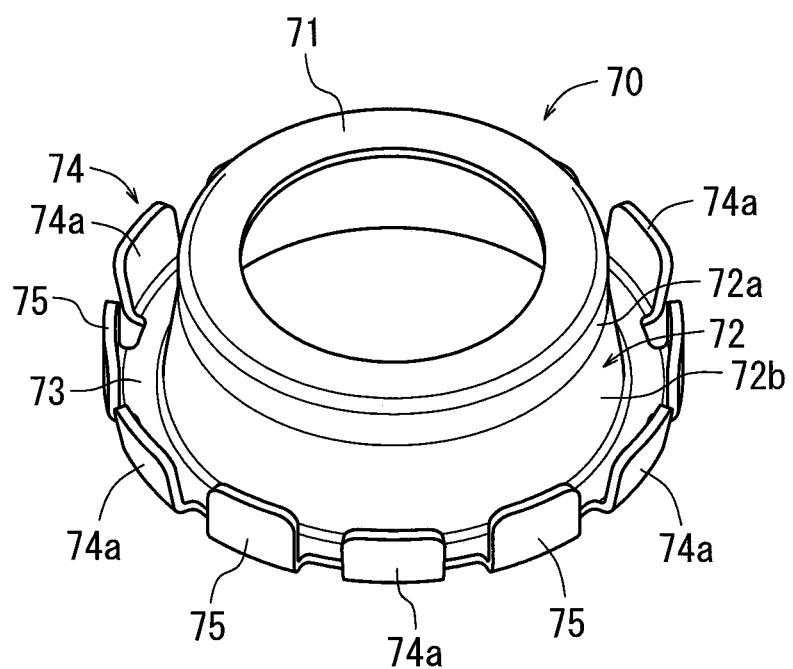
FIG. 5 is a perspective view of the retainer of FIG. 2.
Figure 6:
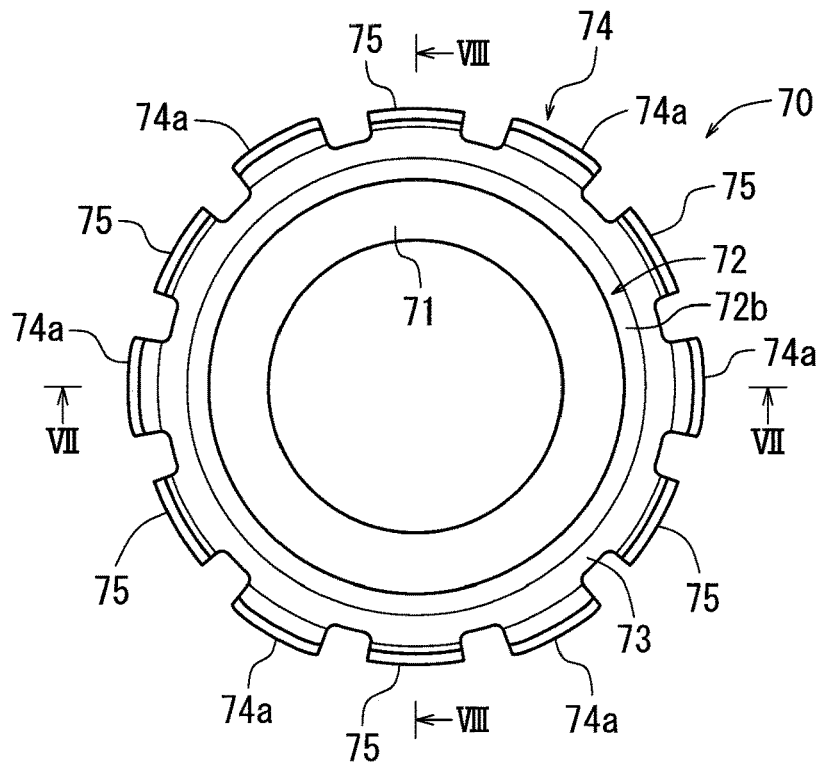
FIG. 6 is a plan view of the retainer of FIG. 2.
Figure 7:
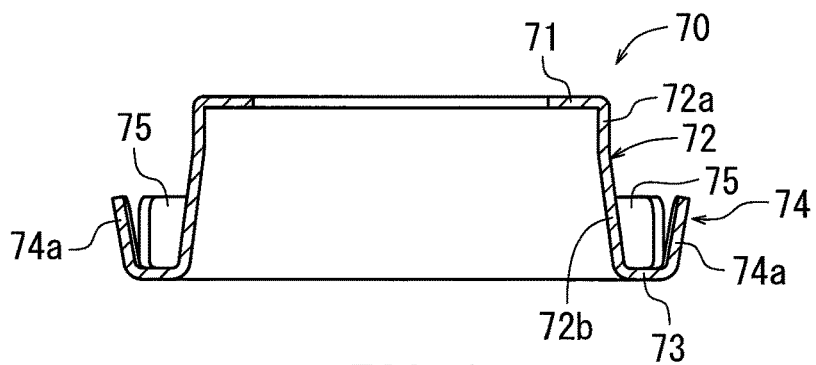
FIG. 7 is a cross-sectional view of the retainer of FIG. 2 taken along line VII-VII in FIG. 6.
Figure 8:
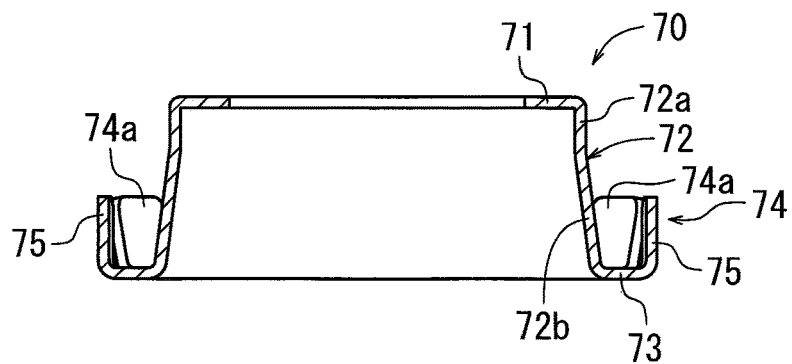
FIG. 8 is a cross-sectional view of the retainer of FIG. 2 taken along line VIII-VIII in FIG. 6.

FIG. 5 is the perspective view of the retainer 70, and FIG. 6 is the plan view of the same. FIG. 7 is the cross-sectional view of the retainer 70 taken along line in FIG. 6, and FIG. 8 is the cross-sectional view of the retainer 70 taken along line in FIG. 6. As shown in FIG. 5, the retainer 70 includes a spring seat 71, a spring guide portion 72, a support portion 73, and a press-fit piece group or member 74 (also see FIGS. 6 to 8). The retainer 70 is made of a metal material. Specifically, the retainer 70 is formed by press-molding a metal material having a spring property. The retainer 70 may be also referred to herein as a "valve opening pressure adjustment member."

The spring seat 71 has an annular plate shape. The spring guide portion 72 has a cylindrical shape and extends from the outer peripheral portion of the spring seat 71 in the axial direction (downward). As shown in FIGS. 7 and 8, an upper half portion 72a of the spring guide portion 72 has a straight cylindrical shape. A lower half portion 72b of the spring guide portion 72 has a tapered cylindrical shape that gradually expands in diameter toward the bottom. The support portion 73 has an annular plate shape extending radially outward from the lower end portion of the spring guide portion 72 (see FIG. 6). The spring guide portion 72 is disposed between the spring seat 71 and the press-fit piece member 74.

As shown in FIG. 6, the press-fit piece member 74 includes a plurality of (for example, six) press-fit pieces 74a extending upward from an outer periphery of the support portion 73. Each of the press-fit pieces 74a has a square plate shape (see FIG. 5). The six press-fit pieces 74a are arranged at regular intervals in the circumferential direction of the support portion 73. In other words, the six press-fit pieces 74a are arranged to be spaced away from each other in the circumferential direction of the retainer 70. The press-fit piece member 74, corresponding to the six press-fit pieces 74a, is formed in a tapered cylindrical shape as a whole such that it gradually increases in diameter from the lower end portion (base end portion) in an opposite direction (upward) to the direction in which the first spring 55 is compressed (downward). That is, the press-fit piece member 74 is inclined such that the distance from the upper end portion (tip portion) to the center axis of the retainer 70 is greater than the distance from the lower end portion (base end portion) to the center axis of the retainer 70. The press-fit pieces 74a have a spring property that is elastically deformable in the radial direction of the retainer 70, that is they have elasticity.

The press-fit piece member 74 is disposed on the outer peripheral portion of the retainer 70. Further, the press-fit piece member 74 is disposed at a position separated from the spring seat 71 in the axial direction. In other words, the press-fit piece member 74 is spaced from the spring seat 71. The press-fit piece member 74 may be positioned away from the spring seat 71 in the direction in which the first spring 55 is compressed (downward) (see FIG. 7). In the free state of the press-fit pieces 74a, the base end portion (lower end portion) of the press-fit piece member 74 has an outer diameter smaller than the diameter of the inner peripheral wall surface of the valve chamber 33. Further, when the press-fit pieces 74a are in the free state, the tip portion (upper end portion) of the press-fit piece member 74 has an outer diameter larger than the diameter of the inner peripheral wall surface of the valve chamber 33.

An inclination suppression piece 75 is provided between each pair of adjacent press-fit pieces 74a of the press-fit piece member 74. Each inclination suppression piece 75 is formed in a square plate shape extending upward from the outer periphery of the support portion 73. The inclination suppression pieces 75 are formed as a whole in a straight cylindrical shape extending from the lower end portion (the base end portion) in an opposite direction (upward) to the direction in which the first spring 55 is compressed (downward). That is, each inclination suppression piece 75 faces the central axis of the retainer 70 and extends in parallel to the central axis of the retainer 70. The press-fit piece 74a and the inclination suppression piece 75 adjacent to each other are arranged with a predetermined gap therebetween. The inclination suppression piece 75 may be also referred to herein as "inclination suppression portion."

Figure 4:
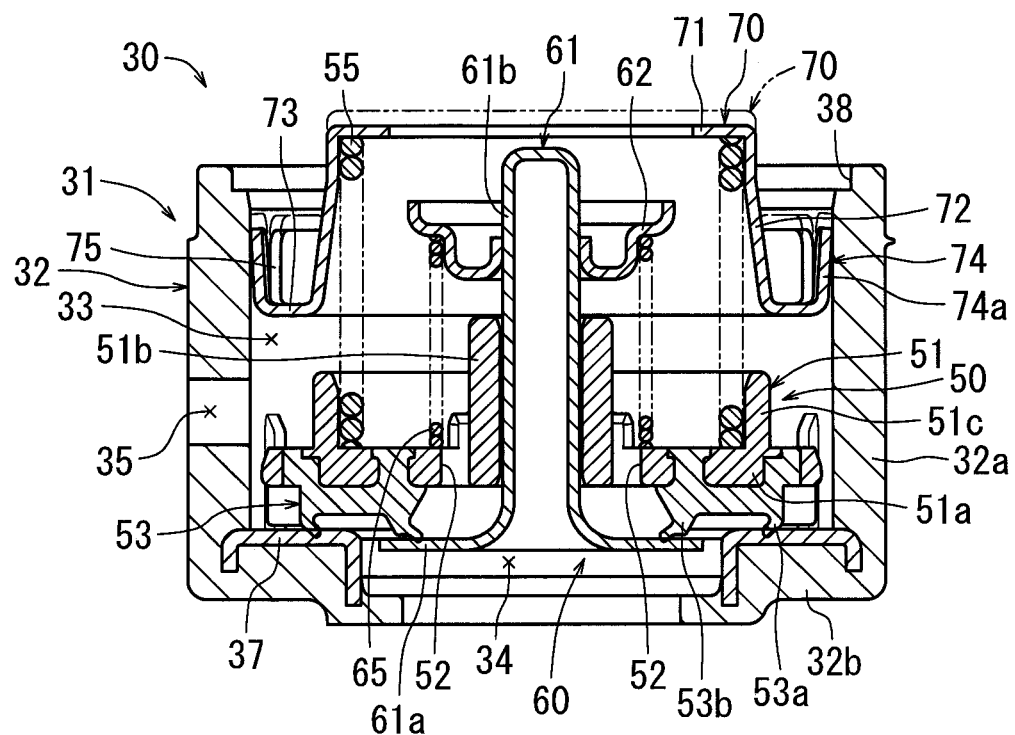
FIG. 4 is a cross-sectional view of the relief valve of FIG. 2 with the cover removed.

As shown in FIG. 4, since the retainer 70 is disposed within the valve chamber 33 of the housing body 32 prior to the attachment of the cover 40, the valve elements 51, 61 and the springs 55, 65 are first disposed in the valve chamber 33 of the housing body 32. Next, the spring seat 71 of the retainer 70 is brought into contact with the upper end surface of the first spring 55. This may be done while fitting the spring guide portion 72 of the retainer 70 to the upper end portion of the first spring 55. In this attachment state, the retainer 70 is then pressed downward against the biasing force of the first spring 55. As a result, each press-fit piece 74a of the press-fit piece member 74 of the retainer 70 is press-fit into the cylindrical wall portion 32a of the housing body 32 (see the two-dot chain line 70 in FIG. 4). The press-fit pieces 74a are temporarily held in the press-fitted state by using the spring property (elasticity) of the press-fit pieces. The press-fitting in this step is referred to as a "temporary press-fitting." During press-fitting of the retainer 70, the tip of each press-fit piece 74a is elastically brought into sliding contact with the inner peripheral wall surface of the cylindrical wall portion 32a of the housing body 32. The inner peripheral wall surface of the cylindrical wall portion 32a corresponds to the inner peripheral wall surface of the valve chamber 33.

Next, the current set load of the first spring 55 is measured by a measuring device. An additional press-fit amount required for the target set load is calculated based on the measured value and the spring constant of the first spring 55. The retainer 70 is then further press-fitted into the cylindrical wall portion 32a of the housing body 32 by a pressing member (not shown) based on the calculated additional press-fit amount (see solid line 70 in FIG. 4). Thus, the set load of the first spring 55 is adjusted. The press-fitting in this step is referred to as a "main press-fitting." Further, the retaining force of the press-fit piece member 74 for preventing detachment in the upward direction (the direction opposite to the press-fitting direction), which is caused by press-fitting the retainer 70 into the housing body 32, is larger than the spring force of the first spring 55.

Figure 3:
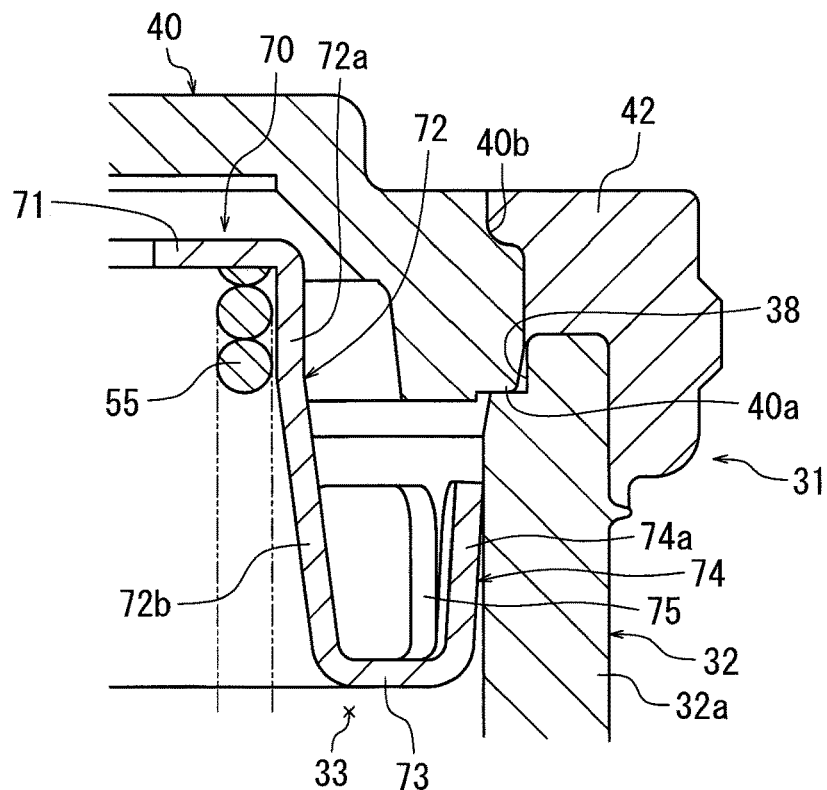
FIG. 3 is an enlarged view of section III in FIG. 2.

Thereafter, the cover 40 is fitted to the housing body 32, and then the retaining member 42 is secondarily molded around the housing body 32 and the cover 40 (see FIGS. 2 and 3). The cover 40 and the retainer 70 are arranged so as not to be in contact with each other.

In accordance with the present embodiment, the retainer 70 has the press-fit piece member 74 comprising a plurality of press-fit pieces 74a, which are arranged to be spaced away from each other in the circumferential direction of the retainer 70 and elastically abut the inner peripheral wall surface of the cylindrical wall portion 32a of the housing body 32 of the housing 31. Therefore, the press-fit load when attaching the retainer 70 with respect to the housing body 32 of the housing 31 can be reduced in comparison to a case where the retainer 70 comes into contact with the housing body 32 of the housing 31 over the entire circumference (e.g., as seen in Japanese Laid-Open Patent Publication No. 2019-27286). As a result, the workability for press-fitting the retainer 70 can be improved.

The press-fit piece member 74 is disposed on the outer peripheral portion of the retainer 70. Therefore, the press-fit piece member 74 can be brought into contact with the inner peripheral wall surface of the valve chamber 33 of the housing 31. As a result, there is no need to provide an additional dedicated wall surface with which the press-fit piece member 74 must come into contact.

The press-fit piece member 74 extends in the direction gradually increasing in diameter from the base end toward the side opposite to the side, in which the first spring 55 is compressed. Therefore, the press-fit piece member 74 can be easily pressed into the inner peripheral wall surface of the valve chamber 33 of the housing 31 (e.g., the inner peripheral wall surface of the cylindrical wall portion 32a of the housing body 32). Further, it is possible to suppress the displacement of the press-fit piece member 74 in the detachment direction after adjusting the valve opening pressure.

The inclination suppressing pieces 75 for suppressing the inclination of the retainer 70 are formed between the adjacent press-fit pieces 74a of the press-fit piece member 74. Accordingly, if the retainer 70 is inclined during press-fitting the retainer 70 within the inner peripheral wall surface of the valve chamber 33 of the housing 31, the inclination suppression pieces 75 come into contact with the inner peripheral wall surface of the valve chamber 33 so as to suppress and reduce the inclination of the retainer 70.

The retainer 70 includes the cylindrical spring guide portion 72 for guiding the outer peripheral side of the upper end portion of the first spring 55. Therefore, the spring guide portion 72 of the retainer 70 can stabilize the orientation of the first spring 55. In particular, in the present embodiment, the orientation of the upper end portion (the end portion on the spring seat 71 side) of the first spring 55 is stabilized by the straight cylindrical upper half portion of the spring guide portion 72, and the spring guide portion 72 can be easily fitted to the first spring 55 due to the tapered cylindrical lower half portion of the spring guide portion 72.

The spring guide portion 72 is formed between the spring seat 71 and the press-fit piece member 74 of the retainer 70. The press-fit piece member 74 is disposed at a position away from the spring seat 71 in the axial direction. Accordingly, the axial length of the spring guide portion 72 can be made longer as compared to a case where the press-fit piece member 74 is disposed at a position close to the spring seat 71. As a result, the orientation of the first spring 55 can be further stabilized.

The retainer 70 is not affected by a disturbance (for example, caulking pressure when the cover 40 is attached to the housing body 32 by caulking, secondary molding pressure of the retaining member 42, or the like) after adjustment. Thus, a displacement of the retainer 70 caused by a disturbance can be reduced, so as to suppress a change of the set load of the first spring 55.

Since the retainer 70 can be press-fitted to the inner peripheral wall surface of the valve chamber 33 of the housing 31 in a stepless manner, the set load of the first spring 55 can be steplessly adjusted.

Figure 9:
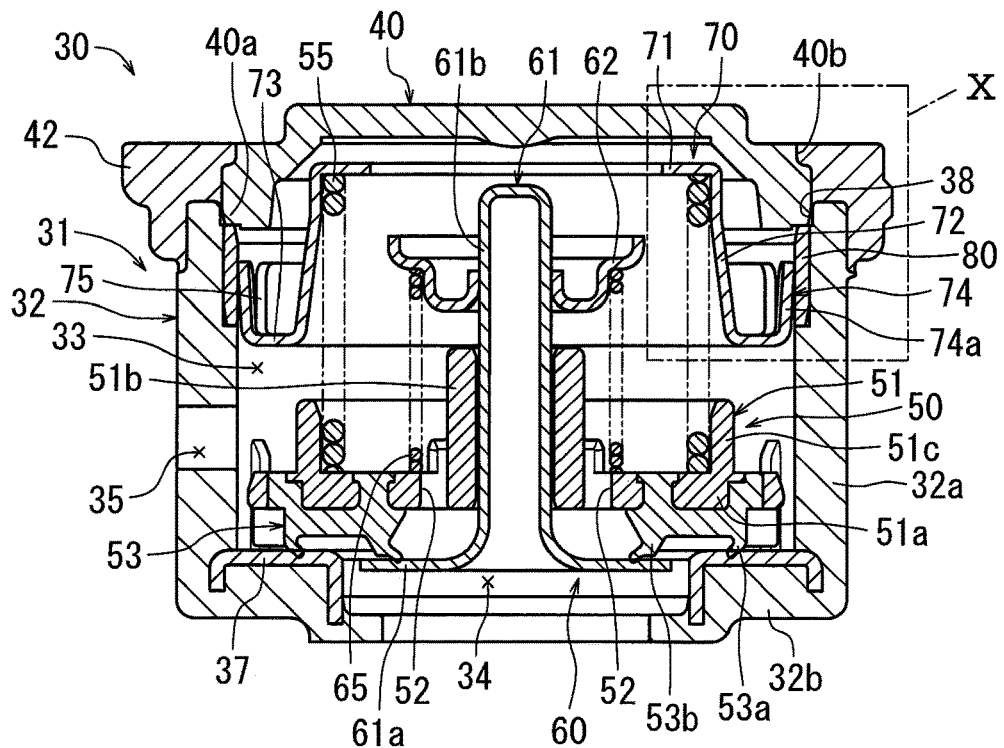
FIG. 9 is a cross-sectional view of a relief valve according to a second embodiment.
Figure 10:
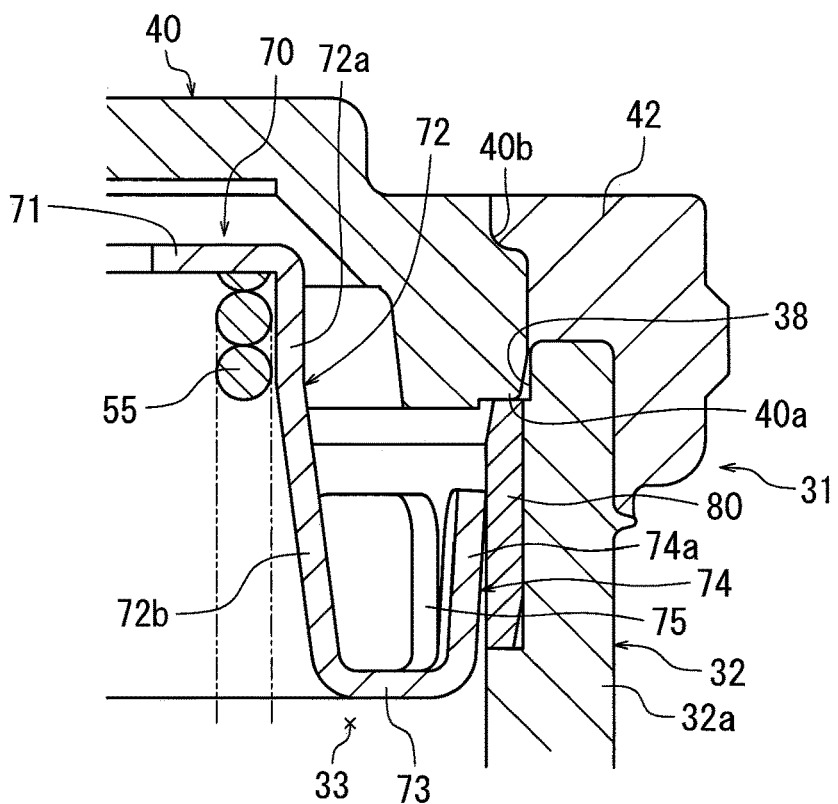
FIG. 10 is an enlarged view of section X in FIG. 9.

A second embodiment is substantially the same as the first embodiment described above with some modifications to the housing body 32 (see FIG. 2). Thus, the modified portions will be described, while the portions similar to those of the first embodiment are denoted by the same reference numerals and redundant description thereof will be omitted. FIG. 9 is a cross-sectional view of the relief valve 30 according to the second embodiment, and FIG. 10 is the enlarged view showing section X of FIG. 9.

As shown in FIG. 9, a metal ring 80 made of a metal material is disposed on the inner periphery of the upper end portion of the cylindrical wall portion 32a of the housing body 32 of the housing 31. The metal ring 80 has a straight cylindrical shape. The metal ring 80 is integrated with the housing body 32 by, for example, insert molding. The metal ring 80 has the same inner diameter as the inner diameter of the cylindrical wall portion 32a of the housing body 32. Therefore, the tip portion of each press-fit piece 74a of the press-fit piece member 74 of the retainer 70 elastically abuts an inner peripheral wall surface of the metal ring 80 (see FIG. 10). The inner peripheral wall surface of the metal ring 80 corresponds to an embodiment of the "inner peripheral wall surface of the valve chamber" as used herein.

In accordance with the second embodiment, the press-fit piece member 74 of the retainer 70 and the metal ring 80 disposed on the housing body 32 of the housing 31, both of which are made of metal, are brought into contact with each other. Thus, the displacement of the retainer 70 in the detachment direction caused by, for example, resin creep due to a thermal load of the housing body 32 of the housing 31 can be suppressed, so as to improve the reliability of the retainer 70 against detachment.

Figure 11:
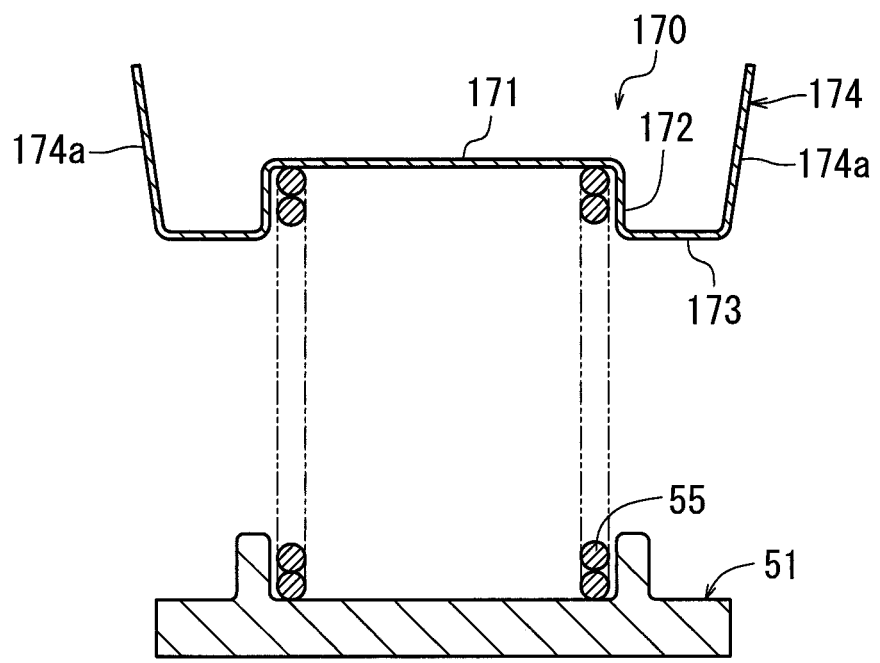
FIG. 11 is a schematic view of a retainer according to a third embodiment.

A third embodiment is substantially the same as the first embodiment with some modifications to the retainer 70 (see FIG. 2). Thus, the modified portions will be described, and redundant description thereof will be omitted. FIG. 11 is the schematic view of a retainer 170. As shown in FIG. 11, a spring guide portion 172 has a short cylindrical shape extending downward. The spring guide portion 172 is concentrically formed on the outer peripheral portion of a spring seat 171 of the retainer 170. A support portion 173 is formed at a lower end portion of the spring guide portion 172. A press-fit piece group or member 174, comprising a plurality of press-fit pieces 174a, is formed on an outer peripheral portion of the support portion 173. The upper end portion of the press-fit piece member 174 is disposed at a position higher than the spring seat 171. In FIG. 11, the inclination suppression pieces 75 of the retainer 70 (see FIG. 7) of the first embodiment are not shown. The spring seat 171 has a circular plate shape. The retainer 170 of the third embodiment may be also referred to herein as a "valve opening pressure adjusting member."

Figure 12:
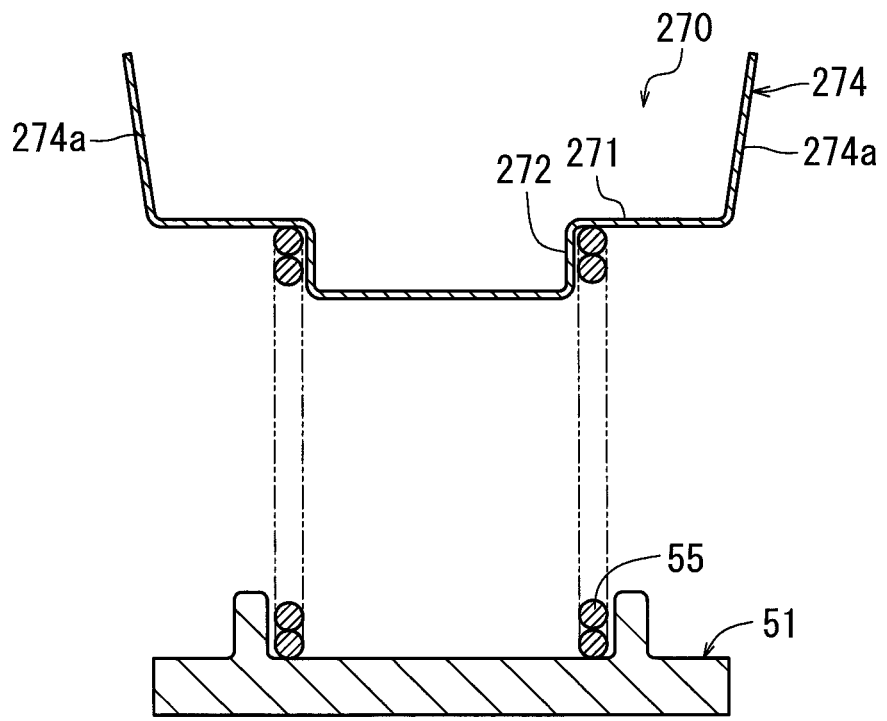
FIG. 12 is a schematic view of a retainer according to a fourth embodiment.

A fourth embodiment is substantially the same as the first embodiment with some modifications to the retainer 70 (see FIG. 2). Thus, the modified portions will be described, and redundant description thereof will be omitted. FIG. 12 is the schematic view of a retainer 270. As shown in FIG. 12, a spring guide portion 272 has a short cylindrical shape extending downward. The spring guide portion 272 is concentrically formed at an inner peripheral portion of a spring seat 271 of the retainer 270. The spring guide portion 272 has a bottomed cylindrical shape. The spring guide portion 272 is fitted into an upper end portion of the first spring 55 and guides the inner peripheral side of the upper end portion of the first spring 55.

A press-fit piece group or member 274 includes a plurality of press-fit pieces 274a. The press-fit piece member 274 is disposed on an outer periphery of the spring seat 271. The press-fit piece member 274 is arranged at a position higher than the spring seat 271. The spring seat 271 also serves as a support portion for supporting the press-fit piece member 274. In FIG. 12, the inclination suppression pieces 75 of the retainer 70 of the first embodiment (see FIG. 7) are not shown. The retainer 270 may be also referred to herein as a "valve opening pressure adjusting member."

Figure 13:
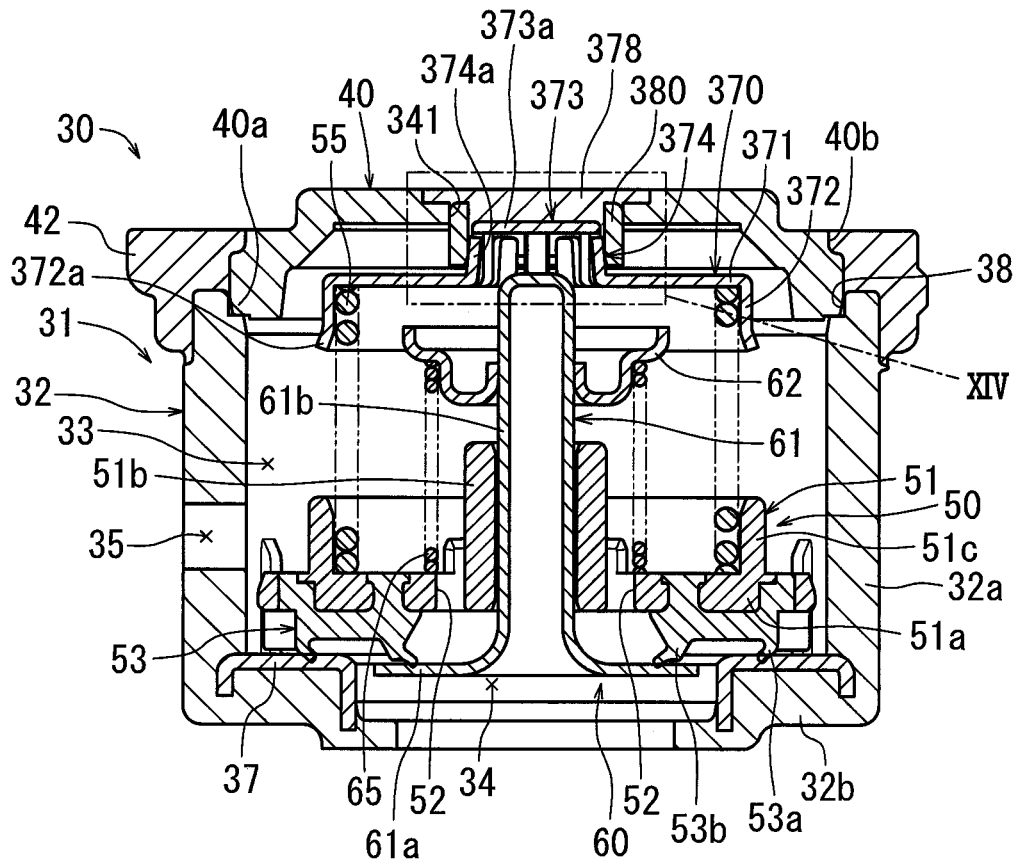
FIG. 13 is a schematic view of a retainer according to a fifth embodiment.
Figure 14:
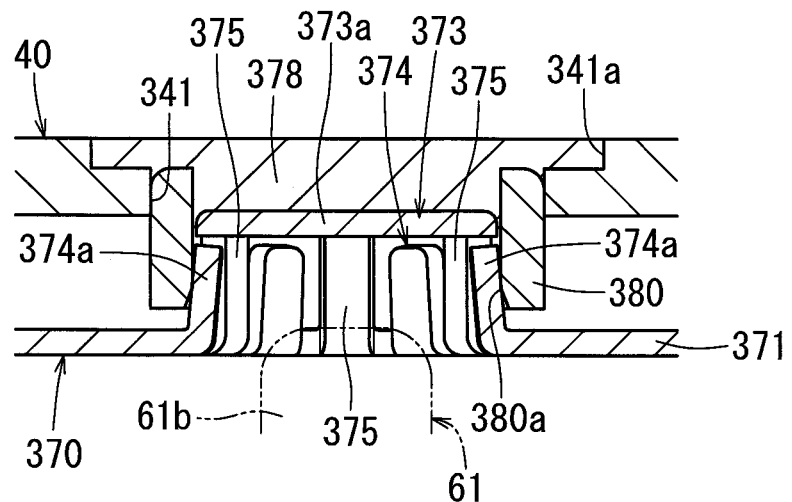
FIG. 14 is an enlarged view of section XIV in FIG. 13.
Figure 15:
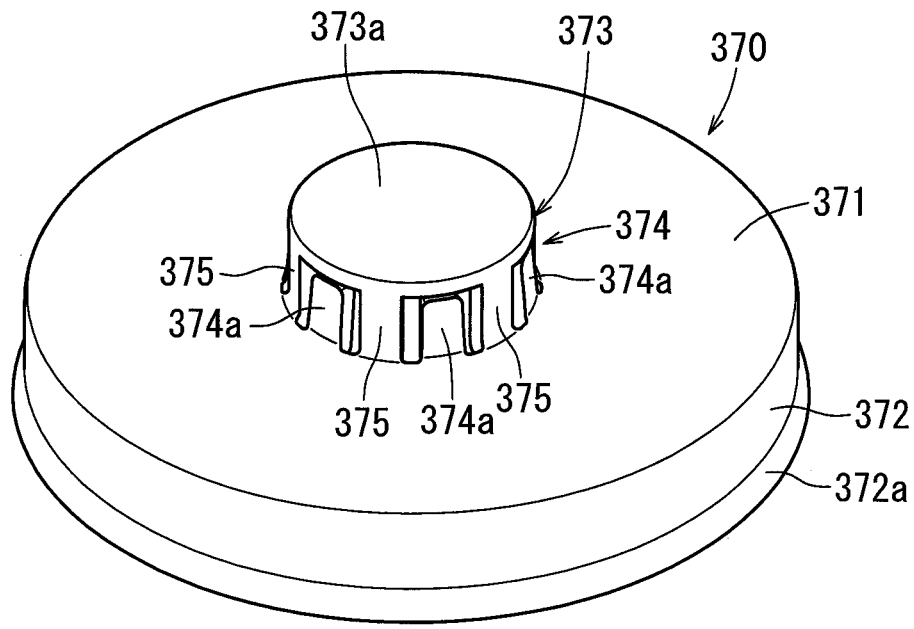
FIG. 15 is a perspective view of the retainer of FIG. 13.
Figure 16:
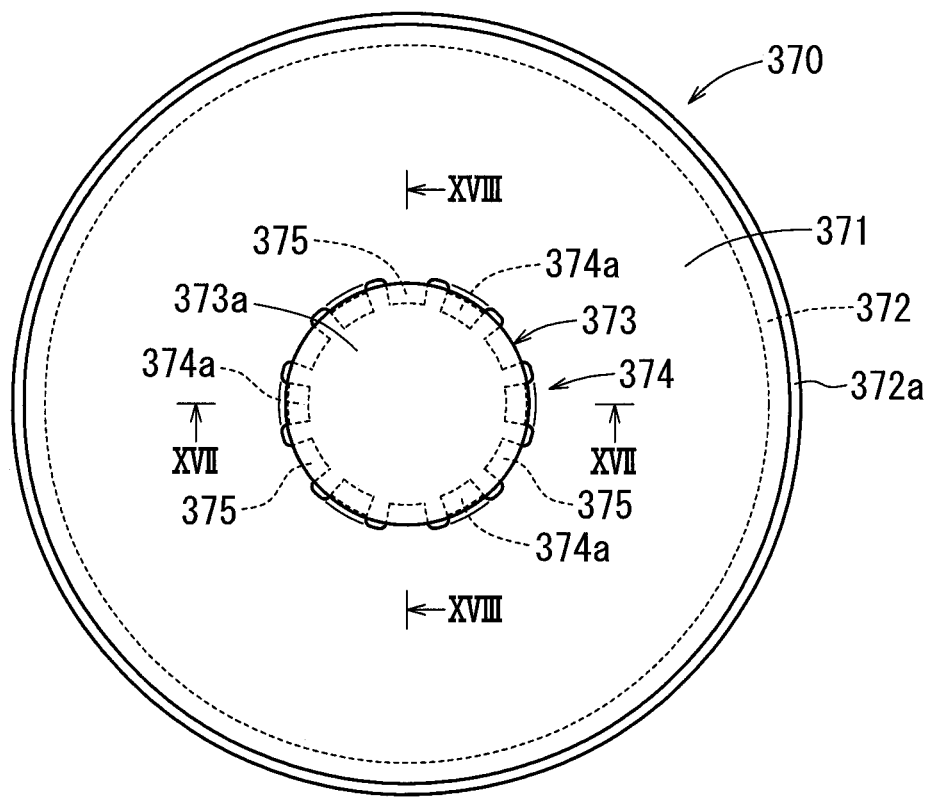
FIG. 16 is a plan view of the retainer of FIG. 13.
Figure 17:
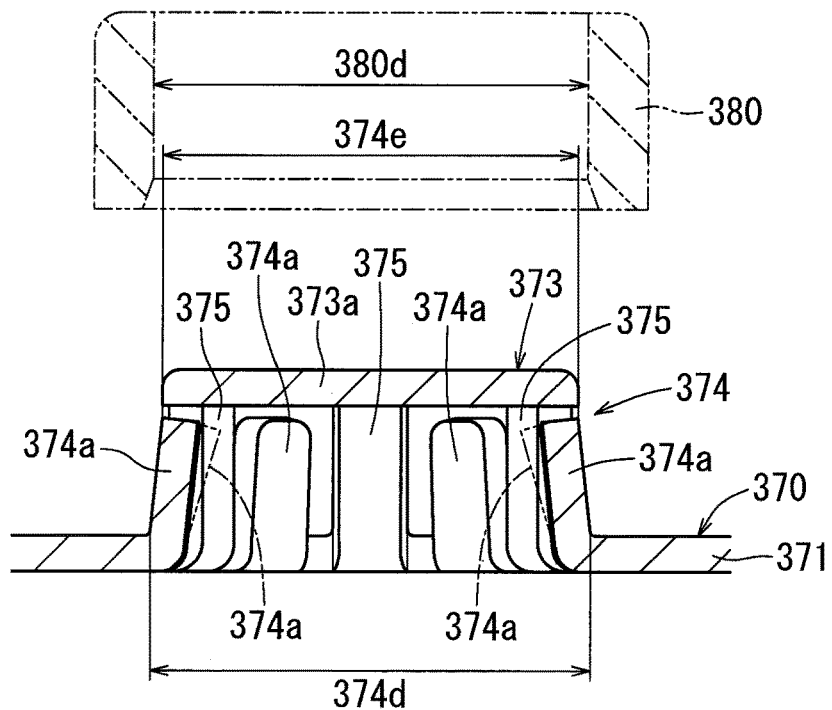
FIG. 17 is a cross-sectional view of the retainer of FIG. 13 taken along line XVII-XVII in FIG. 16.
Figure 18:
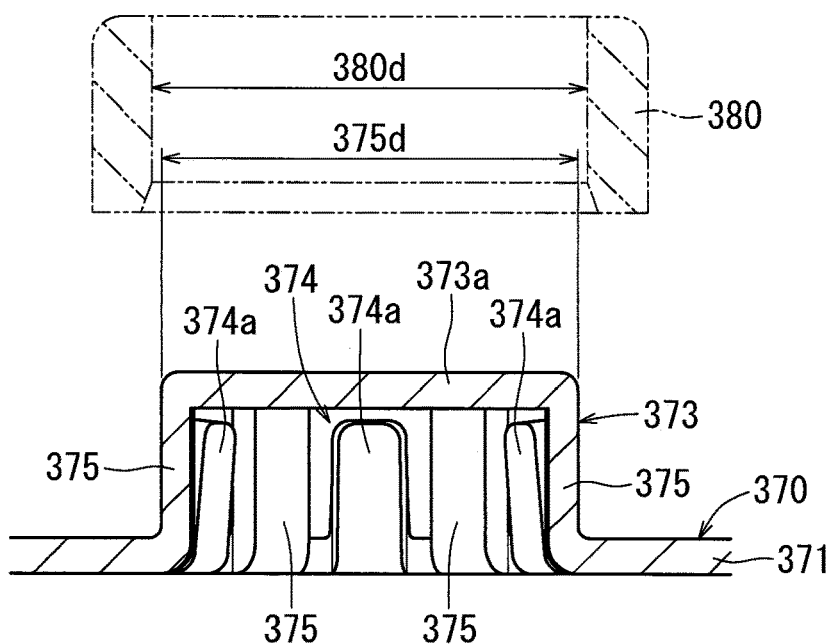
FIG. 18 is a cross-sectional view of the retainer of FIG. 13 taken along line XVIII-XVIII in FIG. 16.
Figure 19:
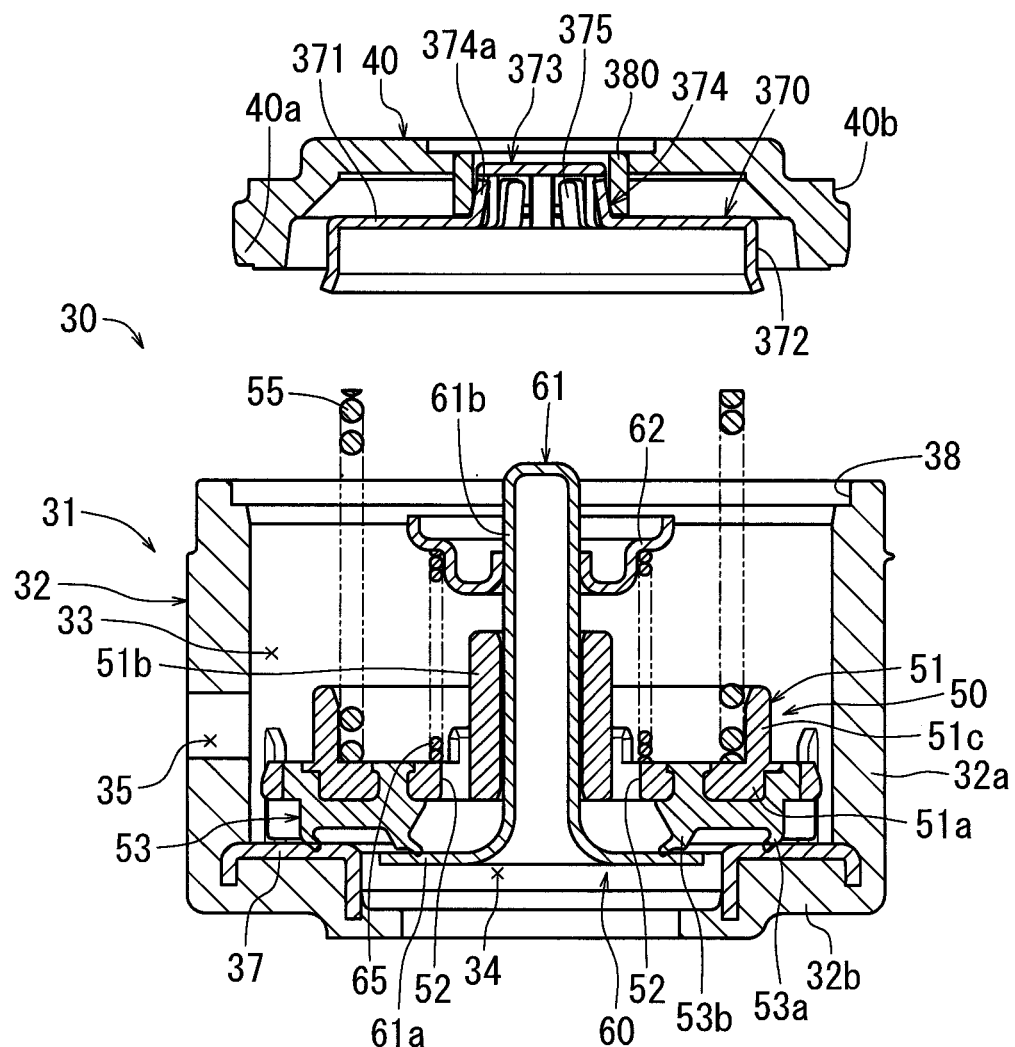
FIG. 19 is a cross-sectional view of the retainer of FIG. 13, and illustrating an attachment process of the retainer.

A fifth embodiment is substantially the same as the first embodiment with some modifications with respect to the attachment structure of the retainer 70 to the housing 31 (see FIG. 2). Thus, the modified portions will be described, and redundant description thereof will be omitted. FIG. 13 is the cross-sectional view of the relief valve 30 according to the fifth embodiment. FIG. 14 is the enlarged view showing the section XIV of FIG. 13. FIG. 15 is the perspective view of a retainer 370, and FIG. 16 is the plan view of the same. FIG. 17 is the sectional view taken along line XVII-XVII in FIG. 16. FIG. 18 is the cross-sectional view taken along line XVIII-XVIII in FIG. 16. FIG. 19 is a cross-sectional view of the relief valve 30 showing the attaching process of the retainer 370.

As shown in FIG. 13, a hollow cylindrical attachment hole 341 is concentrically formed in a central portion of the cover 40 (see FIG. 14). The attachment hole 341 opens toward the side (upper side) of the valve chamber 33 opposite to the first communication port 34. As shown in FIG. 14, a recessed groove 341a having a counterbored shape is formed in an upper end opening periphery of the attachment hole 341.

In the attachment hole 341, a metal ring 380 made of a metal material is concentrically integrated by, for example, insert molding. The metal ring 380 has a straight cylindrical shape. An upper end surface of the metal ring 380 is substantially flush with a bottom surface of the recessed groove 341a. A lower end portion of the metal ring 380 protrudes downward beyond the attachment hole 341. A tapered inclined surface 380a formed by C-chamfering is formed on the inner peripheral wall surface of the lower end portion of the metal ring 380. The inner peripheral wall surface of the metal ring 380 may be also referred to herein as an "inner peripheral wall surface of the attachment hole."

As shown in FIG. 13, the retainer 370 has a spring seat 371, a spring guide portion 372, and a fitting cylindrical portion 373 (see FIGS. 15 and 16). The retainer 370 is made of a metal material. Specifically, the retainer 370 is formed by press-molding a metal material having a spring property. The retainer 370 may be also referred to herein as a "valve opening pressure adjusting member."

The spring seat 371 has a circular plate shape. The spring guide portion 372 has a cylindrical shape extending from the outer peripheral portion of the spring seat 371 in the axial direction (downward). Most of the spring guide portion 372 is a straight cylindrical shape, and a lower end portion 372a of the spring guide portion 372 has a tapered cylindrical shape that gradually increases in diameter toward the lower side.

The fitting cylindrical portion 373 has a hollow cylindrical shape protruding from a center portion of the spring seat portion 371 toward a side (upper side) of the spring seat portion 371 opposite to the first spring 55 side (see FIG. 15). The fitting cylindrical portion 373 is disposed concentrically with the retainer 370. As shown in FIG. 14, an upper end opening portion of the fitting cylinder portion 373 is closed by a lid plate portion 373a having a circular plate shape. The fitting cylindrical portion 373 may be also referred to herein as a "fitting portion."

As shown in FIG. 16, a press-fit piece group or member 374, comprising a plurality of (for example, six) press-fit pieces 374a, is disposed at an outer circumferential portion of the fitting cylindrical portion 373 (see FIG. 15). The six press-fit pieces 374a are arranged at a regular interval in the circumferential direction of the fitting cylindrical portion 373. That is, the six press-fit pieces 374*a* are arranged to be spaced away from each other in the circumferential direction of the retainer 370. Each press-fit piece 374*a* has a vertically long rectangular plate shape with an arc-shaped cross section.

As shown in FIG. 17, each press-fit piece 374*a* is formed by cutting and raising the center portion of the spring seat portion 371, specifically, a belt-like portion corresponding to a portion between a position shifted radially outward from the lower end portion of the fitting cylinder portion 373 and the upper end portion of the fitting cylinder portion 373. The six press-fit pieces 374*a*, that is, the press-fit piece member 374, are formed as a whole in a tapered cylindrical shape that gradually decreases in diameter from the base end portion (lower end portion) toward the upper side. That is, each press-fit piece 374*a* is inclined such that the distance from the base end portion (lower end portion) to the center axis of the retainer 370 is longer than the distance from the tip portion (upper end portion) to the center axis of the retainer 370. Here, the upward direction means the direction (upward) opposite to the direction (downward) in which the first spring 55 is compressed (see FIG. 13).

The press-fit pieces 374*a* have a spring property, also referred to as elasticity, that is elastically deformable in the radial direction of the retainer 370 (see the two-dot chain line 374*a* in FIG. 17). In the free state of the press-fit pieces 374*a*, the base end portion (lower end portion) of the press-fit piece member 374 has an outer diameter 374*d* slightly larger than an inner diameter 380*d* of the metal ring 380. Further, in the free state of the press-fit pieces 374*a*, the tip portion (upper end portion) of the press-fit piece member 374 has an outer diameter 374*e* slightly smaller than the inner diameter 380*d* of the metal ring 380.

As shown in FIG. 16, the fitting cylindrical portion 373 has inclination suppressing pieces 375 that are disposed between adjacent press-fitting pieces 374*a* of the press-in piece member 374 (see FIG. 15). Each inclination suppression piece 375 has a column shape extending from the lower end portion of the fitting cylindrical portion 373 to the lid plate portion 373*a*. The six inclination suppression pieces 375 of this embodiment are formed in a straight cylindrical shape as a whole. The press-fit pieces 374*a* and the inclination suppression pieces 375 adjacent to each other are arranged at predetermined intervals in the circumferential direction. The inclination suppression pieces 375 may be also referred to herein as an "inclination suppression portion."

As shown in FIG. 18, the combination of the six inclination suppression pieces 375 and the lid plate portion 373*a* have an outer diameter 375*d* that is slightly smaller than the inner diameter 380*d* of the metal ring 380. Thus, the six inclination suppression pieces 375 can be fitted into the metal ring 380 of the cover 40 with a small gap formed therebetween.

As shown in FIG. 19, the fitting cylindrical portion 373 of the retainer 370 is inserted into the metal ring 380 of the cover 40 from below. Accordingly, each press-fit piece 374*a* of the press-fit piece member 374 of the fitting cylindrical portion 373 is press-fitted into the metal ring 380 of the cover 40 using its spring property (elasticity). The press-fitting in this state is referred to as "temporary press-fitting." In the temporary press-fitting state of the retainer 370, each press-fit piece 374*a* of the press-fit piece member 374 is elastically brought into sliding contact with the inner peripheral surface (for example, the upper end corner of the inclined surface 380*a*) of the metal ring 380. Accordingly, each press-fit piece 374*a* is elastically deformed (deflected and deformed) in the diameter-reduced direction. In this disclosure, press-fitting in a direction in which the first spring 55 is compressed may be also referred to herein as a "forward direction press-fitting." The temporary press-fitting in the direction opposite to the direction in which the first spring 55 is compressed may be referred to herein as a "reverse direction press-fitting."

The valve elements 51, 61 and the springs 55, 65 are disposed within the valve chamber 33 of the housing body 32. Next, the spring seat 371 is brought into contact with the upper end surface of the first spring 55 while being fit within the spring guide portion 372 of the retainer 370. The retainer 370 was previously attached to the cover 40. In this state, the cover 40 is pressed downward against the biasing force of the first spring 55 and is fitted to the housing body 32. Thereafter, the retaining member 42 is secondarily molded around the housing body 32 and the cover 40 (see FIG. 13). At this time, the retainer 370 is positioned above the position shown in FIG. 13.

Next, the set load of the first spring 55 is measured by the measuring device. An additional press-fit amount required for the target set load is calculated based on the measured value and the spring constant of the first spring 55. The fitting cylindrical portion 373 of the retainer 370 is press-fitted downward (in the forward direction) by a pressing member (not shown) based on the calculated additional press-fit amount (see FIG. 13). Thus, the set load of the first spring 55 is adjusted. The press-fitting in this state is referred to as a "main press-fitting." Further, due to the main press-fitting of the retainer 370 with respect to the cover 40, the press-fit piece member 374 maintains the press-fit state with respect to the metal ring 380 due to the elastic restoring force of the press-fit pieces 374*a*. In this state, the force of the press-fit piece member 374 for preventing detachment upward (in the direction opposite to the forward press-fitting direction) is greater than the spring force of the first spring 55.

The recessed groove 341*a* of the cover 40 is filled with a sealing material 378 made of a potting resin or the like. Thereafter, the sealing material 378 is hardened.

In accordance with the fifth embodiment, the retainer 370 has the press-fit piece member 374 that includes a plurality of the press-fit pieces 374*a*. The press-fit pieces 374*a* are arranged to be spaced away from each other in the circumferential direction of the retainer 370 and elastically abut the inner peripheral wall surface of the attachment hole 341 of the cover 40 of the housing 31. Therefore, the press-fit load of the retainer 370 with respect to the cover 40 of the housing 31 can be reduced as compared to a case where the retainer 370 abuts the cover 40 of the housing 31 over the entire circumference (e.g., see Japanese Laid-Open Patent Publication No. 2019-27286). As a result, the workability for press-fitting the retainer 370 can be improved.

The attachment hole 341 is formed in the cover 40 of the housing 31. The retainer 370 includes the fitting cylindrical portion 373 to be fitted to the attachment hole 341. The press-fit piece member 374 is formed on the outer periphery of the fitting cylindrical portion 373. Accordingly, the retainer 370 can be reduced in diameter. Consequently, the relief valve 30 can be made compact.

The diameter of the press-fit piece member 374 gradually decreases as it extends in a direction from the base end toward the side opposite to the direction in which the first spring 55 is compressed. Therefore, the press-fit piece member 374 can be easily press-fitted to the inner peripheral wall surface of the metal ring 380 of the cover 40 of the housing 31.

The inclination suppressing pieces 375, which are for suppressing the inclination of the retainer 370, are respectively formed between the adjacent press-fitting pieces 374a of the press-fit piece member 374. Accordingly, if the retainer 370 is inclined during press-fitting of the retainer 370 with respect to the inner peripheral wall surface of the metal ring 380 of the cover 40 of the housing 31, the inclination suppression pieces 375 abut the inner peripheral wall surface of the metal ring 380, so as to suppress inclination of the retainer 370.

The cylindrical spring guide portion 372 for guiding the outer peripheral side of the upper end portion of the first spring 55 is formed in the retainer 370. Therefore, the orientation of the first spring 55 can be stabilized by the spring guide portion 372 of the retainer 370.

Further, the press-fit piece member 374 of the retainer 370 and the metal ring 380 disposed on the cover 40 of the housing 31 are brought into contact with each other. Both the press-fit piece member 374 and the metal ring 380 are made of metal. Thus, displacement of the retainer 370 in the detachment direction due to resin creep caused by, for example, the thermal load of the cover 40 of the housing 31 can be suppressed. This improves the reliability of the retainer 370 against detachment.

The retainer 370 is not affected by disturbance (for example, caulking pressure when the cover 40 is attached to the housing body 32 by caulking, secondary molding pressure of the retaining member 42, etc.) after adjustment. Accordingly, the displacement of the retainer 370 due to a disturbance can be reduced, so as to suppress change in the set load of the first spring 55.

The retainer 370 can be pressed into the cover 40 of the housing 31 in a stepless manner, so that the set load of the first spring 55 can be steplessly adjusted.

The technology disclosed herein is not limited to the above-described embodiments, and can be implemented in various other forms. For example, the technology disclosed herein is not limited to the relief valve 30 of the fuel vapor processing apparatus 10, and may be applied to a relief valve of another device. The number of the press-fit pieces 74a, 174a, 274a, 374a and/or the inclination suppression pieces 75, 375 of the retainers 70, 170, 270, 370 may be increased or decreased. The retainers 70, 170, 270, 370 may be made of a resin material. In addition, the metal ring 380 may be omitted.

The present disclosure discloses various aspects of the technology. A first aspect is a flow control valve that includes a housing having a hollow cylindrical valve chamber and a valve port that opens at one end of the valve chamber. The flow control valve also includes a valve element configured to open and close the valve port, a spring biasing the valve element in a closing direction, and a valve opening pressure adjustment member that includes a spring seat that supports an end of the spring on a side opposite to the valve element side of the spring. A set load of the spring is adjusted based on an amount by which the valve opening pressure adjustment member is press-fitted into the housing. A press-fit piece group or member includes a plurality of press-fit pieces. The press-fit piece member is formed in the valve opening pressure adjustment member, such that the press-fit pieces are arranged to be spaced away from each other in a circumferential direction of the valve opening pressure adjustment member. The press-fit pieces elastically abut the housing.

In accordance with the first aspect, the valve opening pressure adjustment member has the press-fit piece member including a plurality of press-fit pieces that are arranged to be spaced away from each other in the circumferential direction of the valve opening pressure adjustment member and elastically abut the housing. Accordingly, the press-fit load of the valve opening pressure adjustment member with respect to the housing can be reduced in comparison to a case where the valve opening pressure adjustment member abuts on the housing over the entire circumference (see Japanese Laid-Open Patent Publication No. 2019-27286). As a result, the workability of press-fitting of the valve opening pressure adjustment member can be improved.

A second aspect is the flow control valve of the first aspect, wherein the press-fit piece member is disposed on an outer circumferential portion of the valve opening pressure adjustment member.

In accordance with the second aspect, the press-fit piece member can be brought into contact with the inner peripheral wall surface of the valve chamber of the housing. Accordingly, there is no need to provide a dedicated wall surface with which the press-fit piece member comes into contact.

A third aspect is the flow control valve of the second aspect, wherein the press-fit piece member extends in a direction gradually increasing in a diameter from a base end thereof toward a direction opposite to a direction in which the spring is compressed.

In accordance with the third aspect, the press-fit piece member can be easily press-fitted with respect to the inner peripheral wall surface of the valve chamber of the housing. Further, the displacement of the press-fit piece member in the detachment direction can be prevented even after adjusting the valve opening pressure.

A fourth aspect is the flow control valve of the third aspect, wherein a spring guide portion having a cylindrical shape is formed between the spring seat and the press-fit piece member of the valve opening pressure adjustment member, and wherein the press-fit piece member is disposed at a position spaced away from the spring seat in an axial direction.

In accordance with the fourth aspect, the axial length of the spring guide portion can be made longer in comparison to a case where the press-fit piece member is disposed close to the spring seat. Accordingly, the posture of the spring can be further stabilized A fifth aspect is the flow control valve of the first aspect, wherein the housing has an attachment hole opening on a side of the housing opposite to the valve port of the valve chamber, wherein the valve opening pressure adjustment member includes a fitting portion fitted with the attachment hole, and wherein the press-fit piece member is disposed on an outer circumferential portion of the fitting portion.

In accordance with the fifth aspect, the diameter of the valve opening pressure adjustment member can be decreased. Accordingly, the flow control valve can be made compact.

A sixth aspect is the flow control valve of any one of the second to fifth aspects, wherein an inclination suppression portion, which is configured to suppress inclination of the valve opening pressure adjustment member, is formed between adjacent press-fit pieces of the press-fit piece member.

In accordance with the sixth aspect, when the valve opening pressure adjustment member is inclined during press-fitting of the valve opening pressure adjustment member with respect to the inner peripheral wall surface of the attachment hole of the housing, the inclination suppression portion abuts the inner peripheral wall surface of the attachment hole, so as to suppress inclination of the valve opening pressure adjustment member.

A seventh aspect is the flow control valve of any one of the first to sixth aspects, wherein the valve opening pressure adjustment member is made of metal, wherein the housing is made of resin, and wherein the housing is provided with a metal ring on which the press-fit piece member abuts.

In accordance with the seventh aspect, the press-fit piece member of the valve opening pressure adjustment member and the metal ring disposed on the housing, both of which are made of metal, are brought into contact with each other. Thus, displacement of the valve opening pressure adjustment member in the detachment direction caused by resin creep due to the thermal load of the housing can be suppressed. This improves the reliability of the valve opening pressure adjustment member against displacement.

What is claimed is:

1. A flow control valve, comprising:
a housing having a hollow cylindrical valve chamber and a valve port that opens at a first end of the valve chamber;
a valve element configured to open and close the valve port;
a spring biasing the valve element in a closing direction; and
a valve opening pressure adjustment member that includes a spring seat supporting an end of the spring on a side of the spring opposite to a valve element side of the spring, wherein:
a set load of the spring is set based on an amount by which the valve opening pressure adjustment member is press-fitted into the housing;
the valve opening pressure adjustment member comprises a press-fit piece assembly including a plurality of press-fit pieces; and
the press-fit pieces are arranged to be spaced away from each other in a circumferential direction of the valve opening pressure adjustment member and are configured to elastically deform in a radial direction of the valve opening pressure adjustment member to elastically abut the housing.

2. The flow control valve of claim 1,
wherein the press-fit piece assembly is disposed on an outer circumferential portion of the valve opening pressure adjustment member.

3. The flow control valve of claim 2,
wherein the press-fit piece assembly gradually increases in diameter from a base end of the press-fit piece assembly moving a direction opposite to the closing direction of the valve element.

4. The flow control valve of claim 3, wherein:
a spring guide portion is provided between the spring seat and the press-fit piece assembly of the valve opening pressure adjustment member;
the spring guide portion has a cylindrical shape and is configured to guide the spring; and
the press-fit piece assembly is disposed at a position spaced away from the spring seat in an axial direction of the valve chamber.

5. The flow control valve of claim 1, wherein:
the housing has an attachment hole opening on a side of the housing opposite to the valve port of the valve chamber;
the valve opening pressure adjustment member includes a fitting portion fitted with the attachment hole; and
the press-fit piece assembly is disposed on an outer circumferential portion of the fitting portion.

6. The flow control valve of claim 2, wherein:
an inclination suppression portion is provided between adjacent press-fit pieces of the press-fit piece assembly; and
the inclination suppression portion is configured to suppress inclination of the valve opening pressure adjustment member.

7. The flow control valve of claim 1, wherein:
the valve opening pressure adjustment member is made of metal;
the housing is made of resin; and
the housing is provided with a metal ring on which the press-fit piece assembly abuts.

* * * * *